Patented Aug. 20, 1940

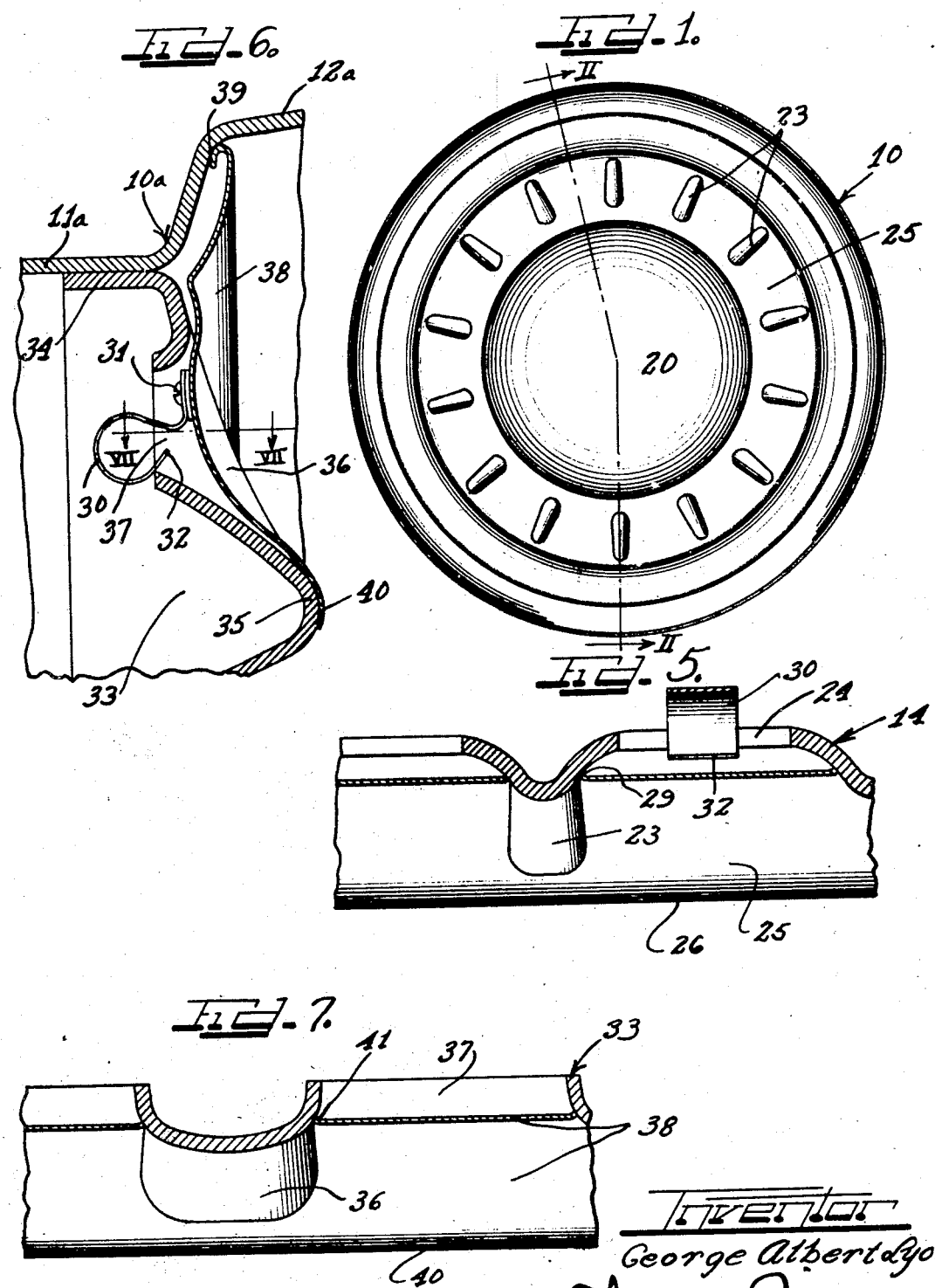

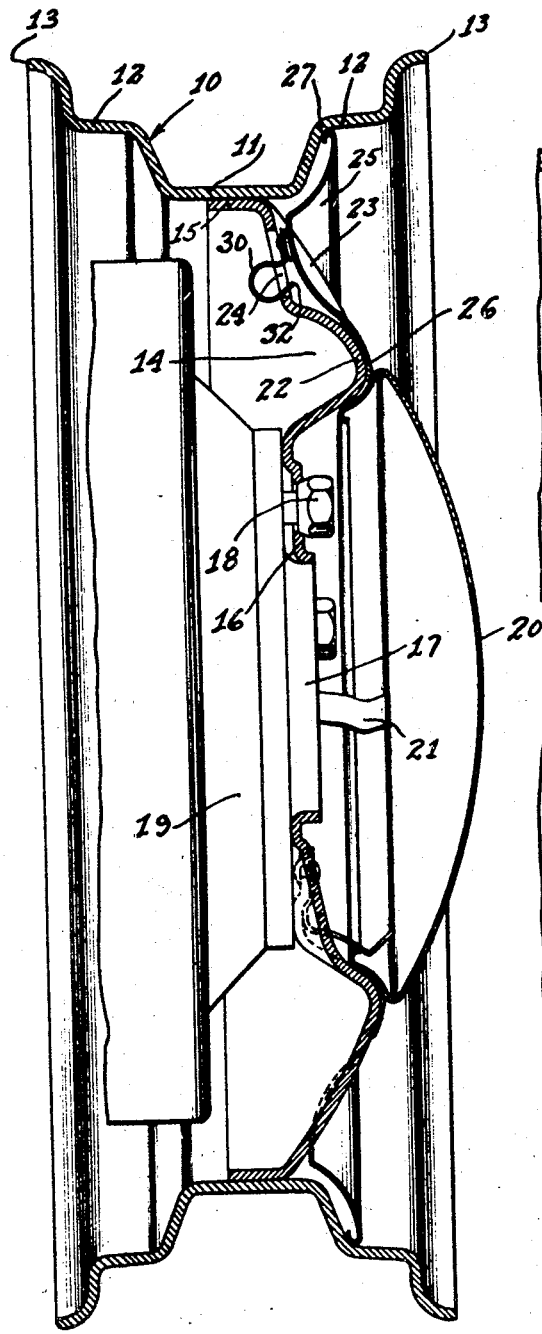
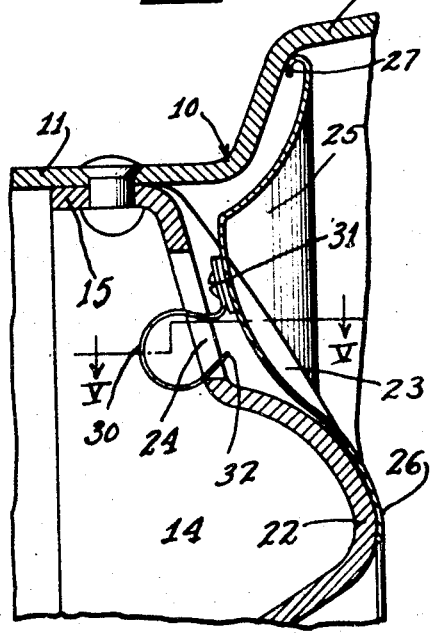
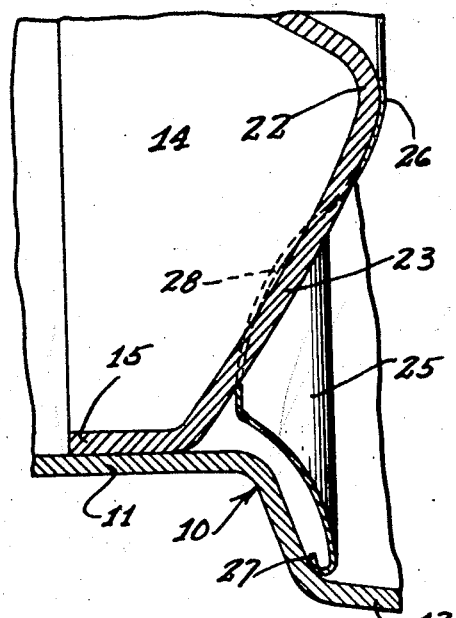

2,212,039

UNITED STATES PATENT OFFICE 2,212,039

ORNAMENTAL WHEEL DISK CONSTRUCTION

George Albert Lyon, Detroit, Mich.

Application March 13, 1936, Serial No. 68,656
Renewed March 14, 1939

6 Claims. (Cl. 301—37)

This invention relates to improvements in ornamental wheel plates or disks for attachment to the side surfaces of vehicle wheels for the purpose of enhancing the appearance not only of the wheels but also of the vehicles as a whole, although the invention will have other uses and purposes as will be apparent to one skilled in the art.

Vehicle manufacturers and users, especially of vehicles of the type of automobiles, are desirous not only of having the wheels of the vehicles decorated, but of having the wheels colored, even though equipped with ornamental disks, in keeping with the other appointments of the vehicle, and especially in keeping with the colors of the body of the vehicle. Usually automobile wheels, whether subsequently equipped with ornamental wheel disks or plates or not, are initially painted or enameled in keeping with the color of the body of the particular vehicle. Usually, also, the ornamental wheel plate or disk must be provided with some other color as well as a color matching that of a vehicle body, this other color being frequently a chrome or similar finish. It is objectionably expensive in the manufacture of wheel plates and disks, wherein economy is much to be desired, to decorate these disks with two-tone color effects.

With the foregoing in mind, it is an object of the present invention to provide an ornamental wheel plate or disk for attachment over the side surface of a vehicle wheel, which is of such construction as to utilize the paint or other coloring matter upon the vehicle wheel itself to establish a two-tone color effect or blend in harmony with the body color of the respective vehicle.

Another object of this invention is the provision of ornamental wheel plates or disks of extremely economical construction consistent with the provision of a two-tone harmonized color effect on the vehicle wheel in keeping with the coloring of the vehicle body.

Still another object of this invention is the provision of ornamental wheel disks highly desirable for use over the side surfaces of wheels having a body part shaped in simulation of spokes, the disks being so arranged as to permit the spoke portions of the body part of the wheels to extend through the disks and be visible together with the disks from the outer side surface of the wheel.

Also a feature of this invention is the provision of an ornamental disk for disposition over a wheel having a body part apertured in simulation of a spoked wheel, the disk being designed to cover the spaces between the spokes, utilize certain of the apertures as an aid for the engagement of the securing means to hold the disk on the wheel, and permit the spoked portions of the wheel to be visible through the disk.

It is also an object of this invention to provide a disk and wheel construction having means associated therewith for holding the disk in position on the wheel, the means being especially designed to constantly urge the disk into tighter engagement with the wheel, tending to eliminate rattling, drumming, vibratory and similar noises during operation of the vehicle.

The invention in general comprises an ornamental wheel plate or disk for attachment over the side surface of a vehicle wheel, the disk having one or more openings therein through which portions of the vehicle wheel are visible, the wheel already having a color finish thereon, and the disk preferably having a different finish from the visible portions of the wheel. A two-tone color effect is thereby provided for the vehicle wheel which is in keeping with the color of the vehicle body, and the necessity of providing a two-tone color effect upon the ornamental disk itself is eliminated, materially reducing the cost of production of the disk. When the body portion of the wheel is shaped in simulation of a spoked wheel, the ornamental disk may be provided with a plurality of apertures and made in such a way that portions of the wheel body simulating spokes may project through the disk, and the disk need only be given a single color finish on the external surface thereof.

Other objects, features and advantages of this invention will more fully appear from the following description, taken in connection with the accompanying drawings which illustrate several embodiments of the invention, and in which:

Figure 1 is a side elevational view of a vehicle wheel, without the tire, equipped with an ornamental disk structure embodying principles of the present invention;

Figure 2 is an enlarged vertical sectional view, with parts shown in elevation, taken substantially as indicated by the staggered section line II—II of Figure 1 looking in the direction of the arrows;

Figure 3 is a fragmentary enlargement of the upper portion of Figure 2;

Figure 4 is a fragmentary enlargement of the lower portion of Figure 2;

Figure 5 is a fragmentary plan sectional view, taken substantially as indicated by the line V—V of Figure 3;

Figure 6 is a fragmentary vertical sectional view of a slightly different form of wheel construction equipped with a disk embodying principles of the present invention; and Figure 7 is a fragmentary plan sectional view taken substantially as indicated by the line VII—VII of Figure 6.

As shown on the drawings:

In the illustrated embodiment of this invention, there is shown a vehicle wheel including a drop center tire rim generally indicated by numeral 10 and comprising a base flange 11, intermediate flanges 12—12, and side flanges 13—13, all connected in the usual manner. In this instance, a metallic body part 14 is provided for the wheel equipped with an axially extending flange 15 which is secured in any suitable manner to the base flange 11 of the rim, such as by riveting or welding.

The body part 14 is shaped to provide a radially extending fastening flange 16 defining a hub opening 17 and accommodating the usual fastening elements, such as bolts 18, by means of which the wheel may be attached to a vehicle part, such as the brake drum 19, or to a suitable spare wheel carrier. The opening 17 is normally closed by means of a suitable hub cap 20 retained on the wheel by resilient spring elements 21 secured in any desired manner to the body part of the wheel.

Radially outward of the flange 16, the body part 14 is provided with an axially outwardly extending bulge or hump 22 which functions substantially as a seat for the hub cap 20. Between the bulge and the rim, the body part is formed in simulation of a spoked wheel, it being shaped to provide portions 23 to simulate spokes and is recessed and apertured, as indicated at 24, between the portions 23.

In this instance, an ornamental wheel disk 25 is provided which is preferably made of relatively thin metallic sheet material. As illustrated, the disk is provided with an inner part 26 shaped to overlie the hub 22 on the body part of the wheel, and the disk terminates just inside the largest portion of the hub cap between it and the bulge 22, although it will be understood that the disk may be of any desired size so as to cover substantially any desired portion of the side surface of the wheel. In this instance, the other circumferential edge of the disk is rolled inwardly, as indicated at 27, for contact with the wheel rim 10.

The central portion of the disk is formed axially inwardly and is provided with a plurality of apertures 28 therethrough, as indicated in Figure 4, through which the spoked portions 23 of the body part of the wheel may project in the manner seen in Figures 1, 2, 4 and 5. With reference to Figure 5, it will be seen that the disk material is turned inwardly, as indicated at 29, adjacent each of the apertures 28 so as to provide a relatively snug fit around the respective spoked portions 23 of the wheel body.

The attaching means for holding the disk securely upon the wheel, in this instance, are shown as including a plurality of curved spring elements 30 bolted or otherwise secured at spaced intervals to the rear face of the disk, as indicated at 31, the spacing being such that the elements 30 will extend through the aforesaid apertures 24 in the wheel body. It is not necessary to provide one of the retaining elements 30 for each of the apertures 24, a suitable number being utilized.

Each of the elements 30 is in the form of a flat piece of spring metal curved in substantially circular form, leaving one end 32 thereof free from contact with any other part of the elements. The elements are so disposed that some pressure is necessary to force them through the apertures 24, their resiliency permitting sufficient "give" for this purpose. After the disk has been shoved into contact with the wheel, the retaining elements 30 expand into the position seen in Figures 2 and 3, leaving contact with the wheel body along a sloping surface of each element 30 near the respective end 32. This sloping surface is such as to constantly urge the disk into tighter cooperation with the wheel.

In view of the above description, it will be seen that it is a simple expedient to attach the disk to the wheel by merely shoving it axially thereon until it is in tight association with the wheel with the retaining elements engaged in the respective apertures 24. It will be noted that the disk 25 may be given any desired external finish, such as chrome plating, and a two-tone effect is provided by the portions 23 of the wheel body projecting through the disk, the wheel customarily having the same finish as the vehicle body, regardless of whether or not a wheel disk is used. If a separate hub cap is used, as illustrated, it may have even another finish so that substantially any desired color effect may be obtained upon the wheel without necessitating the expensive operation of applying multi-color to the disk itself.

In Figures 6 and 7, I have shown a slightly different form of construction wherein the wheel includes a drop center rim of the same character as above described, including a base flange 11a and intermediate flanges 12a connected in the usual manner. The body part 33 of the wheel includes a flange 34 connected to the rim in any suitable manner, and is shaped to provide a hump 35 of the same character as the aforesaid hump 22. Between the hump or bulge 35 and the rim, the body part is shaped in simulation of a spoked wheel, with portions 36, simulating spokes, and the material of the body part being turned inwardly and apertured, as indicated at 37, between the portions 36.

A disk 38 is provided for the outer side surface of the wheel, and is formed with a rim engaging edge 39 and shaped to fit over the bulge, as indicated at 40, in the manner above described. This disk is held in position on the wheel by the same type of securing means 30, 31 and 32 as above described. Between the shaped portion 40 and the rim contacting edge 39, the disk is shaped axially inwardly and is provided with relatively wide apertures to seat over the spoke portions 36 of the wheel body, which in this instance are wider than shown in Figures 1 to 5, inclusive. Adjacent each spoke portion 36, the material of the disk is turned inwardly, as indicated at 41 in Figure 7, to insure a tight fit pleasing in external appearance.

The disk 38 is mounted in the same manner as the above described disk 25, and the same color scheme may be had.

From the foregoing, it is apparent that I have provided an ornamental wheel disk which may be extremely economically manufactured and associated with a wheel in a manner to produce at least a two-tone color effect, without necessitating any but a single external finish upon the disk itself. The disk is so constructed as to utilize part of the colored surface of the wheel with which the disk is associated to provide the desired color combination. In addition, it will be noted that the disk is attached to the wheel in a manner that augments and urges the disk into tighter cooperation with the wheel at all times.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In combination, a vehicle wheel having a body part shaped in simulation of spokes with apertures therebetween, and an ornamental disk shaped to cover said apertures and provided with openings through which portions of said spokes may extend, said disk being aligned on said wheel by the extension of said portions of said spokes in said openings, and fastening means cooperating with said disk and wheel through said apertures to hold the disk on the wheel.

2. In combination, a vehicle wheel having a body part shaped in simulation of spokes with apertures therebetween, and an ornamental disk shaped to cover said apertures and provided with openings through which portions of said spokes may extend, said disk being aligned on said wheel by the extension of said portions of said spokes in said openings, and concealed fastening means carried by the rear face of said disk and engageable with the wheel through said apertures to hold the disk on the wheel.

3. As an article of manufacture, a wheel cover having a relatively smooth outer side and having a plurality of radially extending spaced apertures formed to fit over correspondingly spaced radial portions of a wheel to align the cover with the wheel and snap-on resilient means for retaining the cover on the wheel.

4. As an article of manufacture, a wheel cover having a relatively smooth outer side and having a plurality of annularly disposed radially extending spaced apertures therein formed to fit over correspondingly spaced portions of a wheel to align the cover on the wheel.

5. In combination, a wheel including a tire rim and a body part having a plurality of spaced apertures, and a snap-on circular member for concealing said apertures having a plurality of rearwardly extending gooseneck spring elements connected thereto and adapted to be registered with and to enter said apertures, each element including a base portion secured to said member and a curved flexible portion with a free end curled back upon said flexible portion and constructed to flex as it enters and engages behind an edge of said corresponding aperture to resiliently bind said member to said body part by a snap-on engagement, said curved flexible portion comprising a substantially circular loop a portion of which engages said edge and an adjacent portion of which overlaps said edge.

6. In combination, a wheel including a tire rim and a body part having a plurality of spaced apertures, and a snap-on circular member for concealing said apertures having a plurality of rearwardly extending gooseneck spring elements connected thereto and adapted to be registered with and to enter said apertures, each element including a base portion secured to said member and a curved flexible portion with a free end curled back upon said flexible portion and constructed to flex as it enters and engages behind an edge of said corresponding aperture to resiliently bind said member to said body part by a snap-on engagement, said curved flexible portion comprising a substantially circular loop a portion of which engages said edge and an adjacent portion of which overlaps said edge, said circular member having inner and outer annular portions for contact with said wheel and said elements being disposed between said portions.

GEORGE ALBERT LYON.